Figure 1:
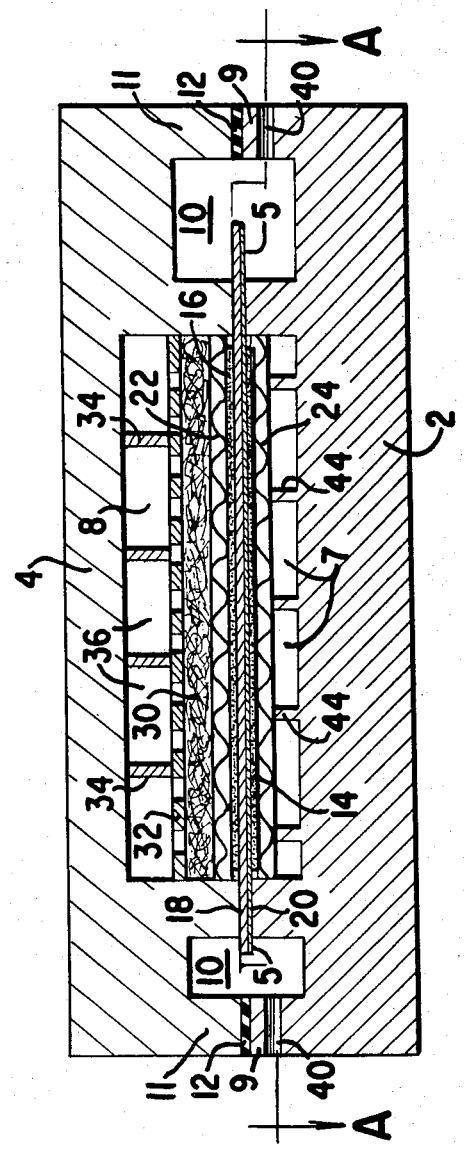

United States Patent [19]

Chisholm

[11] 4,399,009
[45] Aug. 16, 1983

[54] ELECTROLYTIC CELL AND METHOD

[75] Inventor: Raymond S. Chisholm, Pittsburgh, Pa.

[73] Assignee: Oronzio deNora Impianti Elettrochimici S.p.A., Milan, Italy

[21] Appl. No.: 335,371

[22] Filed: Dec. 29, 1981

Related U.S. Application Data

[63] Continuation-in-part of Ser. No. 226,202, Jan. 19, 1981, Pat. No. 4,331,521.

[51] Int. Cl.³ .......................... C25B 1/34; C25B 9/00; C25B 13/02; C25B 13/08
[52] U.S. Cl. ...................................... 204/98; 204/128; 204/266; 204/282; 204/283; 204/296
[58] Field of Search ................. 204/98, 128, 266, 282, 204/283, 296

[56] References Cited

U.S. PATENT DOCUMENTS

| 4,123,336 | 10/1978 | Seko | 204/296 |
| 4,209,368 | 6/1980 | Coker | 204/296 |
| 4,313,805 | 2/1982 | Burney | 204/296 |
| 4,329,434 | 5/1982 | Kimoto | 204/296 |

Primary Examiner—John F. Niebling
Attorney, Agent, or Firm—Hammond & Littell, Weissenberger and Muserlian

[57] ABSTRACT

Chlorine and other halogens can be generated by electrolyzing an aqueous alkali metal halide or hydrogen halide between an anode and cathode in an electrolytic cell having a composite semipermeable membrane separating the said electrodes. This membrane is in sheet form and normally comprises a layer, coating or sheet of a fluorocarbon having cation exchange groups disposed on the anode side and a second layer, coating or sheet on the cathode side which is non-fluorinated or is less fluorinated and consequently more hydrophilic (less hydrophobic) than the first layer and which also has cation exchange groups i.e. acid groups or alkali metal salts thereof attached thereto. The less fluorinated cathodic side apparently releases evolved hydrogen more readily than does the more heavily fluorinated anode layer, particularly when the cathode is in contact with or bonded to and/or embedded in the membrane. The cathode is maintained close enough to the cathode side of the membrane to maintain the more hydrophilic second layer alkaline during the electrolysis and the two layers may be bonded together or may be installed together and in contact with each other without bonding.

16 Claims, 2 Drawing Figures

ELECTROLYTIC CELL AND METHOD

PRIOR APPLICATION

This application is a continuation-in-part application of commonly assigned U.S. application Ser. No. 226,202, filed Jan. 19, 1981, now U.S. Pat. No. 4,331,521.

STATE OF THE ART

Electrolysis of aqueous alkali metal halides to produce halogen, especially chlorine, in an electrolysis cell provided with pairs of an anode and a cathode separated by an ion permeable diaphragm is well known and in some of the said cells, the electrodes are bonded to and/or embedded in opposite sides of the diaphragm which is usually a cation exchange fluorocarbon polymer.

In the latter embodiment, the electrodes often are comprised of electroconductive particles of a platinum group metal or oxide thereof bonded together and to the diaphragm by a polymer of trifluoroethylene or tetrafluoroethylene. A preferred anode is comprised of a mixture of graphite and pulverulent ruthenium oxide bonded with the fluorocarbon polymer in the form of a layer which is pressed against the ion exchange membrane and bonded thereto. A preferred cathode is comprised of platinum black powder optionally admixed with graphite bonded together with a fluorocarbon polymer in the form of a layer which is pressed against and bonded to the opposite side of the diaphragm or membrane. At least some of the bonded particles which project from the layer are partially embedded in the polymer.

The resulting membrane-electrode assembly is mounted in an electrolytic cell to which a substantially saturated aqueous alkali metal halide solution is fed into the anode chamber and water or dilute caustic is fed into the cathode chamber. By establishing an electrical potential between the anode and cathode with individual current distributors in contact with each electrode, chlorine is evolved at the anode and hydrogen and alkali metal hydroxide or carbonate are produced at the cathode. Electrolysis of this type may be conducted at high current densities, on the order of 1,000 to 5,200 amperes per square meter of anode surface and at a voltage which is several hundred millivolts lower than with unbonded electrodes spaced from the membrane.

Difficulties have been encounted in the prolonged operation of such cells because the cathode loses much of its effectiveness before the anode becomes inoperative. It is believed that the platinum black particles of the cathode are attacked by the alkaline catholyte and/or lose their adhesion to the membrane and are washed away. In any event, the layer ceases to function sufficiently as a cathode and the cathode current distributor becomes the cathode partly or completely.

Furthermore, some difficulty has been encountered in achieving optimum current efficiency with certain types of membranes and thus it has been proposed to make use of membranes which predominately contain sulfonic acid groups or like groups of strong acid on one side, notably the side facing the anode and predominately weaker acid groups i.e. carboxylic groups on the opposite side i.e. the cathode side of the membrane. This is described in East German Patent Application No. 93,990. Also, U.S. Pat. No. 4,224,121 of the General Electric Company describes a diaphragm in which the cathode side has a lower water content than does the anode side. In testing such unitary multilayer membranes, blisters have been noted to form within the membrane for reasons not yet fully understood but may be due to the fact that one side of the membrane tends to swell or expand more than the other side and thereby produces stress in the membrane. It may also be due to other causes.

STATEMENT OF INVENTION

In the process of the invention, halogen is produced by electrolysis of an aqueous alkali metal halide in a diaphragm cell having a composite diaphragm or membrane separating the anode from cathode and comprising an organic cation exchange polymer sheet or composite in which the anode surface of the cation exchanger is more hydrophobic or more highly fluorinated than the cathodic surface of such cation exchanger. For example, the diaphragm or membrane on the anode side may be a completely fluorinated or substantially completely fluorinated flurocarbon polymer sheet having cation exchange groups such as carboxylic, sulfonic or phosphonic acid groups attached thereto and exposed to the anolyte.

This membrane sheet is bonded to, coated with or is at least in contact with a less fluorinated and/or more hydrophilic cation exchange layer on the cathode side and this cathodic surface or sheet may unfluorinated. Thus, it may have an unfluorinated hydrocarbon polymeric chain with cation exchange groups such as carboxylic, sulfonic or phosphoric acid groups linked thereto or alternatively, it may have a partially fluorinated hydrocarbon polymeric chain with such groups linked thereto. The groups attached to the cathodic surface may be the same or different from the groups on the anodic surface of the membrane. For example, a cathodic layer in which the cation exchange groups are carboxylic may be bonded to or in contact with a tetrafluoroethylene polymer having sulfonic or carboxylic cation exchange groups.

This composite diaphragm separates the anode from cathode and advantageously, these electrodes are gas and liquid permeable and in contact with opposite sides of the diaphragm. In all events, the cathode is held close enough to the cathode side of the diaphragm to maintain the unfluorinated or less fluorinated surface or layer alkaline which reduces the likelihood of diaphragm degeneration during electrolysis.

By recourse to the composite structure herein contemplated, it is possible to take advantage of the high chemical resistance of the fluorocarbon ion exchangers on the anode side where evolved chlorine may severely attack the diaphragm and to provide less costly membrane surfaces on the cathode side. This reduces the overall cost of the diaphragm by reducing the amount of fluorocarbon polymer required to provide a self sustaining membrane sheet. Furthermore, the cathodic layer, being more hydrophilic than the anode layer, apparently tends to release hydrogen generated in contact therewith more readily than the more highly fluorinated polymers. This is advantageous when the cathode is in contact with or embedded in or bonded to the cathode side of the diaphragm and thus, evolved hydrogen rapidly escapes and the chance of a voltage increase due to hydrogen accumulation is reduced.

The composite membrane or at least the fluorocarbon anode side thereof is most advantageously impermeable to mass flow of anolyte therethrough. The respective layers are relatively thin, usually being in the range of 0.1 to 5 millimeters in thickness, the overall thickness of the multilayer diaphragm usually being 0.1 to 0.5 millimeters. At least one of the layers, preferably the one on the anode side i.e. the fluorocarbon polymer, is impermeable to mass flow of anolyte while permitting cation transfer and some water migration but restraining or substantially preventing migration of chloride (halide) or mass flow of anolyte therethrough from anolyte to catholyte. The layer of lower fluorine content (cathodic layer) generally has a similar impermeability, although it may also be perforated (or highly porous) to permit mass flow of alkali into the pores thereof.

Each layer contains a substantial concentration of cation exchange groups throughout its thickness, usually being in the range of about 0.3 to 2 milliequivalents of such groups per gram of dry polymer and these groups are either active or in the alkali metal salt form thereof e.g. sodium salt. The layers are capable of absorbing water and aqueous alkali and it is particularly important for the unfluorinated or partially fluorinated hydrocarbon ion exchange resin to be capable of absorbing alkali to avoid deterioration of the membrane by maintaining the polymer sufficiently alkaline throughout its thickness to avoid or at least minimize deterioration of the unfluorinated or less fluorinated diaphragm layer.

Care is taken to facilitate and to maintain this alkalinity of the diaphragm layer by maintaining enough alkaline catholyte, e.g. sodium hydroxide solution containing 10% or more by weight of NaOH, to ensure such alkali penetration of the layer. Thus, the cathode chamber generally is flooded with such alkali metal hydroxide solution and indeed the pressure exerted by the solution, at least in some areas of the membrane layer, will usually exceed atmospheric pressure.

One embodiment of an electrolytic cell of the invention comprises a cell unit with at least one anodic compartment equipped with an anode and at least one cathodic compartment equipped with a cathode, said compartments being separated by a diaphragm comprised of at least two separable layers of electrolyte impermeable, ion permeable material in contact with each other, the said layers beng unbonded or weakly bonded together so they are capable of being separated or one of the layers having been at least partially preswelled before bonding.

The electrolysis cell is especially suitable for generating halogen by electrolyzing an aqueous halide and the cell has a multilayer diaphragm, the layers of which are swellable ion exchange polymers which are either unbonded to each other whereby they may contract or swell separately during equilibration or if bonded, at least one of the layers has been at least partially swelled by water or electrolyte before the bonding. Electrodes may be bonded to the outside surfaces of the multilayer diaphragm.

The unbonded layers of the diaphragm maybe evacuated to prevent gas or liquid entrapment between them and the evacuated assembly is installed as a diaphragm in the cell with or without further evacuation before and/or during the electrolysis. Since the layers are unbonded, they are able to swell separately to at least some degree during preparation or use in the cell. The preswelled layers may be bonded together after swelling or they may be unbonded or only weakly bonded. In the latter case, they are readily separable during operation of the cell and if one layer or an electrode bonded thereto degenerates or breaks down faster than the other layer or electrode, the layer may be replaced individually with the other layer being retained in operation.

In one embodiment, a bilayer diaphragm comprising one layer of a fluorocarbon ion exchange polymer having sulfonic acid groups and a second polymer layer having an unfluorinated polymeric carbon chain and carboxylic groups linked thereto may be prepared by preswelling one of these layers e.g. the carboxylic layer by soaking in electrolyte or by conditioning in an atmosphere of steam or air of controlled humidity. The other may be unswelled or conditioned or separately swelled to a different degree of soaking or humidification and the two layers are then bonded together by heat and/or pressure or an adhesive such as a solution of ion exchange polymer. While the degree of difference in swelling may be small, this difference aids in compensating for differences between the two layers in swelling or expanding in the course of preparation for use in the cell and/or during electrolysis.

In the embodiment in which the layers may be unbonded to each other, the separate layers are installed between permeable electrodes or current collectors and pressed tightly together during cell operation, preferably after gas and liquid have been evacuated from between the layers. The layers may be coated with or have bonded thereto (on their outer sides only) gas and electrolyte permeable electrodes and are assembled so that each electrode may be oppositely polarized during the electrolysis. In this case, if one layer or the electrode thereon should degrade or break down before the other layer or if the electrode layer does so, the one layer of membrane may be separated without damaging the other layer. Therefore, it may be replaced with a new electrode layer or a restored layer and this new or restored layer is then assembled with the undegraded electrode layer for continued electrolysis. Obviously, this reduces the overall cost of diaphragm or electrode in those cases where one of the layers or one of the electrodes thereon has a greater durability or life than does the other layer or electrode.

Normally, the separate layers are pretreated or preswelled by boiling in water or aqueous alkali solutions or other techniques normally used to recondition such membranes and are then installed in the cell ready for electrolysis in an unbonded state. These layers are pressed together during electrolysis and, if necessary, the space between them is evacuated so that close contact between the layers is ensured. In the course of their use, some adhesion between the layers may develop but the layers are free to swell i.e. change respective dimensions separately so that if one layer tends to swell more than the other, each may expand independently of the other. Thus, strains which might tend to develop when layers of a membrane are bonded together before preconditioning is at least partially avoided or minimized. Furthermore, unless the sheets or layers are deliberately bonded together, they can be separated without damage so that one can continue in use while the other can be replaced or separately restored.

It is also important to recognize that the degree that a membrane expands is influenced by the electrolyte with which it is in contact. For example, a carboxylic acid membrane will expand to a lower degree when in contact with high sodium hydroxide concentrations, e.g. 40 to 45%, than at lower concentrations. Thus, expansion may vary even during operation if the alkali metal hydroxide concentration changes and such changes can be accommodated if the layers are not bonded together.

In another embodiment, one or both of the layers may be separately swelled to the degree desired and then bonded together. For example, a fluorocarbon polymer having preponderantly sulfonic acid or phosphonic groups may be preconditioned by heating or boiling in water or sodium hydroxide solution or by retaining it in an atmosphere of controlled humidity until it has been swelled at least to some degree and has absorbed some water. It can then be assembled under pressure and bonded to a membrane layer of lower water content having preponderantly weaker acid groups or tending to have lower water content when used e.g. carboxylic acid groups. This bonding may be effected by heating under pressure as long as proper precautions are taken to avoid excessive water loss. For example, the assembled layers may be enclosed in a moisture tight envelope e.g. between two sheets of polyethylene film to retain the water in the one layer during heat and pressure lamination to bond the layers together. Alternately, the layers may be bonded together by applying a coating of a solution of an ion exchange resin such as a fluorocarbon ion exchange resin.

According to a further embodiment, an unfluorinated ion exchange resin such as a styrene-divinyl benzene-maleic anhydride or acrylic acid copolymer may be swelled or partially swelled by soaking in hot or cold alkali metal hydroxide solution and this preswelled sheet may be bonded to a fluorocarbon ion exchange resin containing carboxylic and/or sulfonic groups which may have been unswelled or have been separately swelled.

If desired, the electrodes or one of them bonded to the outer sides of the respective layers may be omitted and in this case, screens or other perforate electrodes are pressed against each side of the multilayer membrane to serve as electrodes. If one layer then deteriorates before the other, the cell is taken apart, the deteriorated layer replaced and the cell reassembled with the new membrane layer held in contact with the older layer of greater durability.

To hold the layers in close contact with each other, the space or area between the layer is evacuated before or during installation in the cell and may even be evacuated during cell electrolysis operation. One convenient method of evacuation is to roll the prewetted layers together. Since the cation exchange sheets are often fluid tight, they may be laminated while wet and air and excess liquid squeezed out by passing them between rolls with the effective evacuation of the space between the layers. Liquid squeezed to the edges seal the edges and tend to preserve the evacuation. Other methods such as clamping or bonding edges and continued evacuation may be used to preserve this evacuated status.

Figure 2:
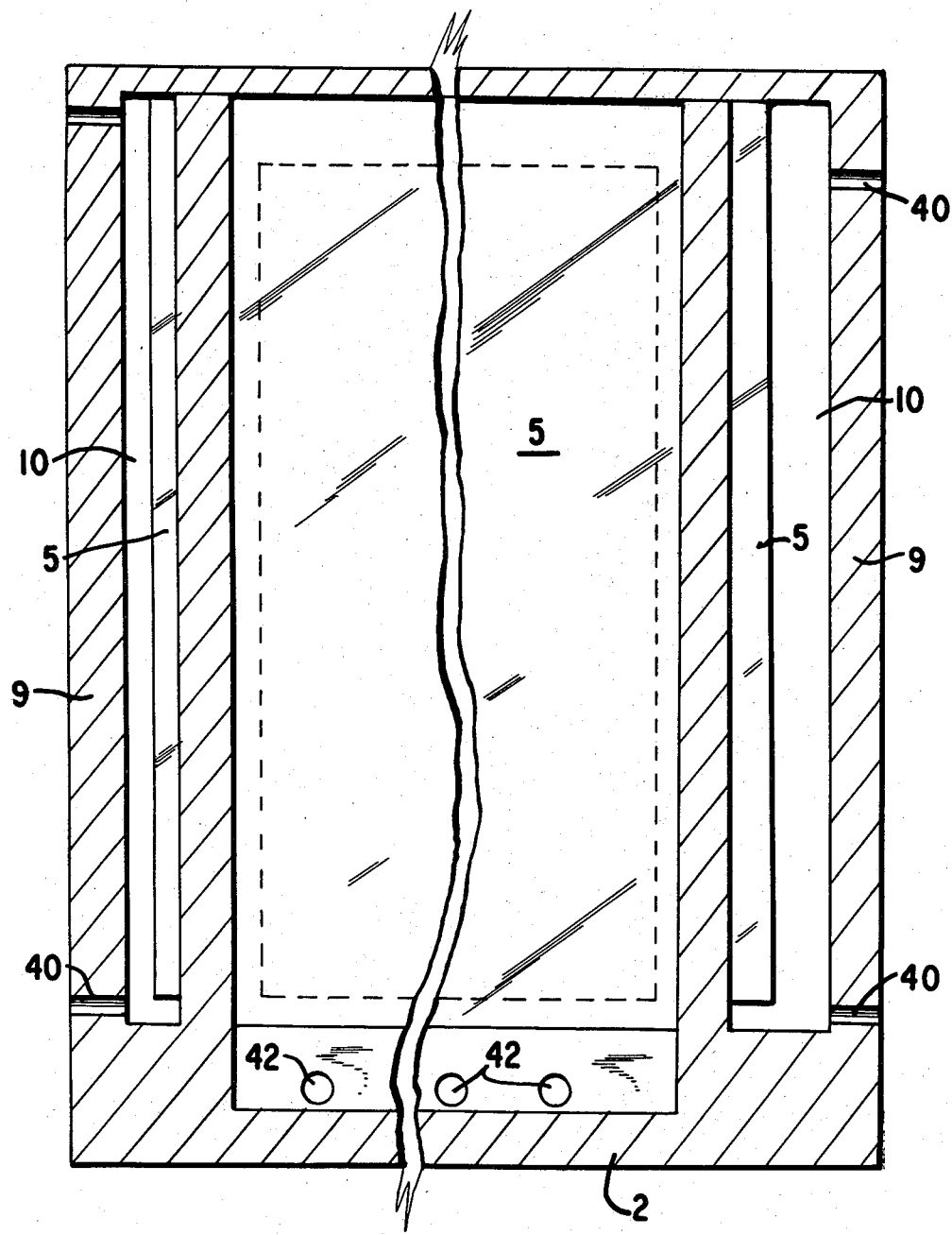

Accomplishment of the foregoing constitute some of the objects of the invention, others of which will be apparent by reference to the ensuring disclosure and the accompanying drawing in which:

FIG. 1 is a diagrammatic horizontal cross sectional view of one embodiment of the cell contemplated; and FIG. 2 is a vertical sectional view of the cell of FIG. 1 taken along line A—A which runs along the outer anode side of the membrane.

As shown in the Figs., the cell is comprised of vertical anode endplate of 2 of a suitably resistant material such as titanium metal (or other valve metal) clad steel and a vertical cathode endplate 4 capable of resisting the cathodic corrosion of alkali such as steel, stainless steel or nickel. Each of these endplates has a central electrolyte channel providing respectively an anolyte channel 7 and a catholyte channel 8. The anode end wall has peripheral side walls 9 which enclose the central anode or anolyte channel and these walls are recessed to provide an outer channel on each side of the central anode channel 7. The cathode end wall also has peripheral side walls which enclose the sides of the central cathode channel and are similarly recessed.

The multilayer diaphragm or membrane is disposed between the two endplates and the peripheral side walls of the endplates tightly butt against opposite edges or margins of the diaphragm to form a seal which is capable of retaining anolyte and catholyte in their respective compartments. The end walls are aligned so that the recessed portions in the side walls mate to provide the gas and fluid tight chamber 10 into which the edges of the diaphragm extend into communication therewith but only partially across the chamber 10. Gaskets 12 may be interposed between the walls to achieve the required seals and to isolate and seal the central anolyte and catholyte chambers from the outer or side chambers and to insulate the anode endplate from the cathode endplate. The endplates are compressed tightly together to make all joints fluid tight.

The diaphgram consists of two layers 18 and 20 which are in tight face-to-face contact with each other and generally, each of these layers are themselves imperforate and do not permit mass flow of electrolyte therethrough although water may be transferred to some extent, largely by dialysis. Also both are ion exchange materials, most often cation exchange materials but, the layers preferably differ in composition and for most purposes, the layer on the cathode side is more weakly acidic than the anode side.

A gas and electrolyte permeable anode 14 is bonded to and/or imbedded in or dispersed in the outer side (the side remote from the other layer 18) of layer 20 and a gas and electrolyte permeable cathode 16 is bonded to and/or embedded in or dispersed in the catholyte or outer side of layer 18. Each of these electrodes is in the form of a thin layer, normally about 20 to 1000 microns in thickness extending along the side of the diaphragm and the overall thickness of the diaphragm layers is small so that the spacing between electrodes is small, rarely being above 0.3 to 3 millimeters.

These electrodes may be produced or deposited on their respective layers in the manner normally resorted to in the art to provide such electrodes. For example, the cathode may comprise platinum black powder or another pulverulent platinum group metal or oxide thereof (with or without graphite powder) and bonded together with a fluorocarbon polymer such as a polymer of tetrafluoroethylene or trifluoroethylene. A layer of this material is pressed against one side of the diaphragm layer and bonded thereto by heat and pressure as described in U.S. Pat. No. 4,210,501 for example. In another method, the electrode may be deposited by an electroless plating process or by vapor deposition or cathode sputtering. In such cases, a thin metal coating, rarely above 0.5 to 5 millimeters in thickness, is deposited and the metal may be platinum, palladium or other platinum group metal but on the cathode side may be nickel or iron which may in turn be coated with platinum, iridium or other platinum group metal.

In any event, each layer is so coated only at its outer side and behind each electrode is a current distributor screen which bears and presses against the electrode. Thus, a thin, flexible screen 24 made of titanium or niobium which may be coated with platinum or like metal presses against the back or exposed side of the anode and distributes current thereto. In like manner, a thin pliable nickel or iron screen presses against the back or exposed side of the cathode and distributes current thereto. The fine mesh of the respective screens provides a plurality, e.g. 30 or more, of contacts per square centimeter with the electrode with which it is in contact. The anode screen, if desired, may be relatively rigid to transmit substantial pressure against the anode and the diaphragm and to resist bending in the spaces between anode ribs 44.

A flexible wire electroconductive mat 30 presses against the cathode screen and this mat is formed of undulating open knitted metal wire and is resiliently compressible to distribute a more or less uniform pressure over the entire screen when it is compressed by movement of an electroconductive rigid perforate pressure plate 32. The pressure plate 32 is spaced from the cathode endplate to provide a rear chamber 36. On the cathode side, electroconductive ribs 34 extend from the cathode endplate across the space 36 and bear against the pressure plate 32. They may be welded to the plate to provide a suitable means for squeezing the mat and they supply current and polarity to the plate 32. Conductive anode ribs also extend across anode chamber 7 and support the anode screen 24. Recourse to such a compressible resilient mat is described and claimed in copending, commonly assigned U.S. patent application Ser. No. 102,629 filed Dec. 11, 1979, U.S. Pat. No. 4,343,690.

As will be apparent from FIG. 1, when the cathode and anode endplates are pressed together, the moveable cathode pressure plate 32 squeezes the mat and thereby presses the screens and the diaphragm layers tightly together. Thus the cell is tightly closed with the electrode screens and the diaphragm squeezed together under a firm pressure which is relatively uniform over the entire diaphragm surface.

The cell illustrated in FIG. 1 is especially designed for use of diaphragm layers which are not bonded together. In such an embodiment, it is important that the layers be held together tightly enough so that gas and/or water or electrolyte does not accumulate between the layers. Thus, means are provided to squeeze the layers together while leaving the membrane edges open so that entrapped gas or liquid may be squeezed out the edges. The diaphragm layers extend a short distance into the peripheral or edge chambers 10 and the pressure in chambers 10 is held low with respect to the pressure applied against the membrane. For example, the chambers 10 may be put under vacuum and in any event, the pressure in the cell anolyte and catholyte to the chambers is held well above that established in chambers 10. Consequently, liquid or gas which might tend initially to accumulate between the layers is effectively squeezed edgewise into chambers 10 and drained or drawn off through ports 40.

As shown in FIG. 2, the electrodes and current distributor screens are centrally disposed and may be (but not necessarily) somewhat spaced from the side walls as illustrated by the dotted lines. In all events, uniform pressure is maintained over the entire area of the enclosed diaphragm to prevent substantial liquid or gas accumulation therebetween. The cell is provided with means to feed anolyte into the bottom of the anolyte chamber through ports 42 and to flow anolyte upward to the top where evolved gas and electrolyte are withdrawn in a manner as described in the aforesaid U.S. Pat. No. 4,343,690. The catholyte chamber is similarly provided with means (not shown) to circulate electrolyte therethrough and to withdraw alkali metal hydroxide solution and hydrogen.

In operation, the cell is assembled as indicated and the individual layers of membrane are pressed together to form the composite diaphragm. Often, the layers are preassembled and evacuated as described below. Chambers 10 are evacuated by pulling a vacuum thereon to remove any entrapped gas and liquid from between the layers and a saturated aqueous sodium chloride solution is fed into the anolyte chamber through ports 42. This solution rises along the anode and screen and escapes with evolved chlorine through ports not shown, is resaturated and recycled to the cell. An electrolyzing voltage high enough to generate hydrogen is imposed between the electrodes to generate chlorine at the anode and at the cathode to generate hydrogen and aqueous sodium hydroxide. Water or dilute sodium hydroxide solution is circulated through the catholyte chamber and flows upward through the mat and along the screen and cathode and the evolved alkali metal hydroxide and hydrogen gas is withdrawn through the top of the cell as is well known in the art.

If desired, chambers 10 may be evacuated throughout the operation but this may be unnecessary after startup so long as a differential pressure is maintained between the pressure in the cell (anolyte and catholyte) and the chamber 10. Generally, the magnitude of this pressure difference does not need to exceed 50 to 1000 millimeters of mercury and in all events, the clamping pressure between the electrode screens should be maintained higher than this edgewise pressure difference so that little or no layer separation may occur. Any gas or liquid leaking into chambers 10 is withdrawn through one of the ports 40.

The process is continued from week to week or month to month and eventually one or the other of the electrodes or the layers deteriorates and the cell is disassembled. Where possible, only the layer or coated layer which has the deteriorated electrode or is itself deteriorated is replaced with a new electrode coated layer and the cell is reassembled for further operation. If desired, the electrode coating on one or both of the layers is dispensed with and in that event, the current distributors 22 and 24 act as the electrodes. In that case, the screens are preferably relatively fine to provide 30 or more contacts per square centimeter and may be 20 to 100 mesh or finer.

A large group of ion exchange membranes suitable for use on the anode side in the electrolysis of aqueous halide solutions is known to the art. Many of these are fluorocarbon polymers which contain cation exchange groups and are copolymers of tetrafluoroethylene with $CF_2=CF-OCF_2CF_2SO_3H$ or other corresponding acidic polymerisable fluorocarbon. These types of materials comprise long fluorocarbon chains with various acidic groups including sulfonic, phosphonic, sulfonamide or carboxylic groups or alkali metal salts of said groups attached thereto. These polymers are described in various patents and articles including the following U.S. Pat. Nos. 3,282,875, 3,784,399, 4,081,349, 4,025,405, 4,065,366, 4,178,218, 3,976,549, 4,151,053 and British Pat. Nos. 1,497,748, 1,184,321, 1,516,048 and 1,493,164 and other publications referred to in these patents. Ion exchange sheets of suitable fluorocarbon polymer are supplied by E. I. DuPont under the trade name "Nafion" and by Asahi Glass Company of Japan under the trade name "Flemion".

Nonfluorinated cation exchange membranes suitable for use on the cathode side also are known to the art and these compounds or polymers have the general formula $C_nH_{2n}(X)_y$ or $C_nH_xF_{x-z}(X)_y$ where n, z, x and y are small whole numbers with the sum of z, y and x being 2. Typical such polymers are ternary polymers including: Styrene copolymerized with an unsaturated organic polymerizable acid such as acrylic acid, fumaric acid, maleic anhydride and ternary polymers of these materials cross-linked with enough divinylbenzene or butadiene to provide chemical stability and copolymers of tetrafluoroethylene and/or trifluoroethylene with acrylic acid or maleic anhydride or fumaric acid. For example, 0.5 to 1.5 mols of acrylic acid or maleic acid may be polymerized with one mol of styrene and 0.5 to 3 mols of divinylbenzene in a sheet form to provide copolymers having cation exchange carboxylic acid groups for the purpose herein contemplated. Also, divinylbenzene-styrene copolymer sheets may be sulfonated to provide sheets having sulfonic groups which are capable of ion transfer and exchange. Various other unflourinated cation exchange sheets or films may be used. Many of such are disclosed in various patents including but not limited to the following U.S. Pat. Nos. 2,681,320, 3,528,858, 3,291,632, 3,134,697 and 4,060,473.

The membranes having predominately sulfonic or phosphonic groups are relatively strong acids and often absorb 25 to 30% by weight of water based upon the dry weight of the polymer. Those which contain predominately carboxylic acids are weaker acids and absorb less water and thus, they expand to a lesser degree when exposed to hot alkali metal hydroxide. The amount of acid groups in these exchanges membranes varies but generally ranges from about 800 to 2000 in equivalent weight.

According to one embodiment, the membrane comprises one layer of a strong acid cation exchange fluorocarbon material or one of high water absorption superimposed upon a layer of a weaker acid unflorinated cation exchanger or one which has lower water absorption. To hold these two layers together, it is desirable to evacuate the space between them and this may be accomplished by wetting the sheets with water or an aqueous electrolyte such as alkali metal hydroxide or carbonate. The assembled laminate is then passed through rolls or is laid out on a flat surface and rolled to squeeze out air and liquid. Since the sheets themselves are relatively fluid tight, the vacuum thus established tends to be maintained by atmospheric pressure. If desired, the edges may be clamped or otherwise protected to prevent loss of evacuation while the diaphragm is installed. Usually, the edge protection means may be removed after the diaphragm has been installed and just before the cell is finally clamped together.

When the layers are not bonded and are held together by the evacuation and/or the lateral pressure applied to the electrodes, any change in dimension due to swelling or contraction of a layer is readily accommodated because the layers are free to slide or move with respect to each other so no strain can be placed on one layer because of change in dimension of the other.

Typical combination of layers to provide the contemplated diaphragm are listed below and the overall thickness of the diaphragm being at least 0.3 to 2 millimeters with the anode side layer being at least 0.1-1.5 millimeter with the cathodic layer being thick enough to provide adequate strength to the diaphragm. Each layer may have an ion exchange capacity of 0.5 to 2 milliequivalents per gram of dry polymer.

| Anode Side | Cathode Side |
| --- | --- |
| 1. Perfluoroethylene polymer containing sulfonic groups capable of cation exchange. | Divinylbenzene-styrene-maleic anhydride or fumaric acid terpolymer. |
| 2. Perfluoroethylene polymer containing sulfonic groups capable of cation exchange. | Divinylbenzene-styrene-acrylic acid terpolymer |
| 3. Perfluoroethylene polymer having cation exchanging carboxylic groups. | Divinylbenzene-styrene-acrylic acid terpolymer |
| 4. Perfluoroethylene polymer having cation exchanging carboxylic groups. | Divinylbenzene-styrene-maleic anhydride ter-polymer. |
| 5. Perfluoroethylene fluoroethylene copolymer having cation exchanging sulfonic and carboxylic groups. | Styrene-divinylbenzene-trifluoracrylic acid terpolymer. |
| 6. Perfluoroethylene fluorovinyl ether copolymer having cation exchanging carboxylic or sulfonic groups. | Tetrafluoroethylene or acrylic acid copolymer or terpolymer. |
| 7. Tetrafluoroethylene-acrylic acid having a mol ratio of fluoroethylene to acrylic acid of 13 to 1. See U.S. Pat. No. 4,060,473 or sulfonated product thereof. | Tetrafluoroethylene-acrylic acid copolymer having a mol ratio of fluoroethylene to acrylic acid of 8 to 1. |
| 8. Perfluoroethylene polymer having carboxylic or sulfonic groups. | Tetrafluoroethylene-acrylic acid copolymer having a mol ratio of fluoroethylene to acrylic acid of 8 to 1. |

The above layers are conditioned or swelled individually by soaking in hot or boiling water or aqueous alkali for several hours and the layers may be held together in unbonded state as described above or may be bonded together under heat and pressure before or after swelling. Also, a reinforcement such as coarse tetrafluoroethylene cloth or the like may be inserted between the layers and the assembly bonded together under heat and pressure or by cation exchange adhesive.

In the following examples there are described several preferred embodiments to illustrate the invention. However, it is to be understood that the invention is not intended to be limited to the specific embodiments.

EXAMPLE 1

A sheet of a polyfluoroethylene polymer having sulfonic acid groups and an equivalent weight of about 1500 and a thickness of about 300 microns is coated on one side with an electrode having electrically conductive ruthenium oxide as its active anodic component. This electrode layer is produced in the known manner by mixing together about 50% by weight of finely divided ruthenium-iridium oxide containing about 25% by weight of iridium, 15% by weight polyfluoroethylene (TEFLON) 25% by weight of titanium dioxide and 10% by weight of graphite. This mixture is then compressed under heat and pressure into a thin film about 0.05 to 0.1 millimeters in thickness and containing about 3 milligrams of platinum group metal oxide per square centimeter of surface area. This thin film is then bonded by heat and pressure to one side of the sulfonic acid polymer and the relative size of the respective sheets is adjusted so that the film is deposited only in a central area of the ion exchange sheet, leaving uncovered margins.

A sheet of terpolymer of equimolar portions of styrene divinylbenzene with enough maleic anhydride to provide a polymer having an equivalent weight of 0.5 to 4 milliequivalents of acid per gram and a thickness of about 300 microns is coated in a central area on one side with nickel metal. The coating is deposited by soaking the polymer sheet in a reducing agent such as hydrazine and contacting the central area of the side of the soaked film with nickel salt such as nickel chloride or sulfate and the margins are shielded to prevent deposition thereupon. The result is to deposit a thin portion coating of nickel of about 2 microns in thickness in a central area and to leave uncoated margins.

The two sheets are heated individually in 2.5 N sodium hydroxide solution at 90° C. for 16 hours. Generally, the anode layer is pressed onto the anode sheet after such heating by pressing the anode sheet onto the equilibrated membrane between pressure plates at an elevated temperature, for example 100 to 300° C., care being taken to retain electrolyte in the sheet.

The thus equilibrated sheets are superimposed with the electrodes on the outer surfaces and the assemblage is rolled while wet to squeeze out air ane excess water. The laminate so formed and evacuated is placed immediately in the cell described above and in the manner described above with the nickel layer on and in contact with cathode side and the ruthenium oxide layer on and bearing against the anode side. These respective electrode coatings are of such a size so that the portion of the diaphragm layers (i.e. their margins) which extend beyond the central electrolysis chamber and into the evacuation chamber 10 remain uncoated.

The cell is then clamped together so as to compress the unbonded membrane-electrode layers together and to prevent or restrain accumulation of entrapped fluid between the layers and to facilitate such squeezing, a vacuum is established in the chambers 10. Saturated aqueous sodium chloride solution is fed into the anode chamber to fill it and the catholyte chamber is filled with 30% sodium hydroxide solution. These electrolytes are circulated through their respective compartments while a voltage sufficient to establish and maintain an anode current density of 4000 amperes per square meter of anode and since the cathode area is substantially the same as that of the anode, the cathode current density is substantially the same.

The process is continued until some marked change in operation take place which is usually manifested by a rise in voltage and the cell is taken apart. Where the cathode layer has deteriorated without serious anode layer deterioration, it is replaced or repaired and the new or repaired cathode sheet is assembled with the old anode sheet for further electrolysis. Similarly, the anode sheet could be repaired or replaced and the new or repaired anode sheet assembled with the old cathode sheet for further electrolysis.

The vacuum on chamber 10 may, but generally need not, be maintained throughout the electrolysis, but the chamber is normally kept drained so that fluid accumulating between the layers could be readily squeezed out. Pressure on the layers by the clamping action of the screen is maintained throughout electrolysis and is maintained high enough to prevent substantial entrapment or accumulation of fluid between the layers and to keep the surfaces of the layers in contact.

If desired, the anode may be metal such as platinum group metal in lieu of the metal oxide sheet. This metal may be deposited on the dry sheet by impregnating the sheet or one side thereof with a reducing agent such as sodium borohydride or hydrazine and then contacting one side of the sheet with a platinum group metal salt such as palladium chloride or platinum chloride. The coating may be made thicker by repeated treatments or by plating further metal, e.g. platinum, on the coating. If desired and to assist in evacuation during rolling to squeeze fluid from the layers as described above in this Example, the assembled layers may be enclosed between air tight plastic sheets or an envelope of polyethylene, polypropylene or the like during rolling. This envelope or these sheets may be used to protect and preserve the evacuation until the diaphragm is installed and they may be removed at that time. Furthermore, cathode and anode screens may be pressed against the diaphragm and the anode and cathode coatings dispensed with.

EXAMPLE 2

The individual fluorocarbon ion exchange polymers bearing electrodes and separately swelled by heating in sodium hydroxide solution prepared as described in Example 1 are coated on the uncoated sides thereof with a water wettable polymerizable liquid containing an unsaturated polymerizable acid and a small amount, e.g. 1% by weight, of catalyst such as isopropyl peroxydicarbonate or hydrogen peroxide. The sheets so coated are rolled to exclude air and excess liquid and are pressed together between plates at room temperature until the liquid has polymerized and the sheets are cemented together to form a laminated diaphragm with electrodes on the outer sides. When hydrogen peroxide or like catalyst is used, the assembled sheets may be heated between pressure plates to 75°-100° C. to polymerize the polymerizable acid and to bond the layers together. The polymerizable liquid containing an acidic group is itself an ion exchange polymer and therefore does not provide a barrier to cation transfer or exchange.

Suitable polymerizable liquids which may be used include the following: trifluoroacrylic acid or acid fluoride, perfluoromethacrylic acid or acid fluoride, 4-vinyl-pyridine and equimolecular mixtures of styrene, maleic acid and 4-vinyl-pyridine. The assembly is installed in the cell to be operated as in Example 1.

EXAMPLE 3

The sheets with electrodes on one side prepared and equillibrated by heating in alkali metal hydroxide solution as described in Example 1 are coated with an adhesive solution of a polymeric acid dissolved in water or ethanol and are assembled with the electrodes on the outside and the resulting laminate was passed through a pair of rolls to squeeze out entrapped air and excess liquid. The assembly is allowed to stand with evacuation preserved until the layers are reasonably well adhered. To assist such adhesion, the assemblies could be placed between pressure plates and heated at 100°-250° C. During standing and/or heating, some water, rarely more than about 20% of the initial amount, may be evaporated. The assembled laminate is installed and is used as a diaphragm in the above described cell and electrolysis of alkal metal chloride solution was commenced.

During such operation, some or perhaps complete deterioration of the adhesive may occur, but because the layers after installation are pressed and clamped together as described above and the clamping pressure is maintained, little or no substantial layer separation takes place. However, when the cell is disassembled, the layers can be separated and one replaced or repaired with the other being reinstalled for further electrolysis.

Adhesives which may be used include: polyacrylic acid, polymethacrylic acid, polymer of equal mols of styrene and acrylic acid or maleic acid anhydride or acid and a water or alcohol soluble fluorocarbon sulfonic acid polymer. Other temporary or permanent adhesives including sugar syrup also may be used. Moreover, the adhesive may be applied only around the uncoated margins, if desired.

EXAMPLE 4

A sheet of fluorocarbon ion exchange membrane having preponderantly sulfonic acid groups and provided with an electrode coating as in Example 1 is treated to establish a water content of about 5 to 20% by weight, based upon the dry weight of the sheet. This is done by heating the sheet in 10% by weight sodium hydroxide solution at 90° C. for one to 5 hours and partially drying, if necessary but it could also be accomplished by storing the sheets in an atmosphere of steam at 110° C. or in air of 100% humidity at 100° C. The anode membrane sheet thus obtained is partially swelled, i.e. about 10 to 30% of the degree to which it would swell if completely equilibrated as described in Example 1.

This anode membrane sheet is then assembled with a substantially dry, unswelled cathode membrane sheet of ion exchange having preponderantly carboxylic acid groups and coated on one side with a cathode as described in Example 1, the electrodes being on the outside of the assembly. This laminated assembly is then bonded together by pressing it between press plates or by passing the assembly through heated rolls at a temperature of 180° to 300° C. and a pressure of 50 to 510 pounds per square inch. If desired, undue water evaporation could be prevented during heating by placing the sheet in a gas tight bag of rubber or polypropylene or by enclosing the laminate between a pair of films or sheets of a non-adherent or readily removable moisture proof plastic such as polyethylene, polypropylene, cellophane etc. The thus bonded membrane electrode may be installed in the cell described above.

If desired, both electrode membrane sheets, one of which is swelled as described in this example, may be bonded together by a binder as disclosed above in Examples 2 and 3. As described above, the cell may be used to generate chlorine by electrolysis of alkali metal chloride solution containing 150 grams per liter or more of alkali metal chloride. Other halides may be similarly electrolyzed to produce the corresponding halogen. These solutions normally have a pH of 2 to 5 and thus contain some quantity of hydrogen halide such as hydrochloric acid.

The alkali metal hydroxide solution produced may range from about 150 grams of said hydroxide solution to substantial saturation by controlling the amount of water fed to the catholyte. Also alkali metal carbonates or bicarbonates may be produced by feeding alkali metal carbonate and/or carbon dioxide to the catholyte. Aqueous hydrogen chloride or other hydrogen halide may be electrolyzed in the same manner.

Hydrogen halide may be electrolyzed in the same manner to generate the corresponding halogen. However, it is desirable to maintain the unfluorinated or lower fluorinated hydrocarbon cation exchange polymer on the cathode side alkaline during the electrolysis. Thus, this polymer should be capable of absorbing and holding throughout its thickness enough alkali to maintain its alkalinity. Such alkalinity can be so maintained when the catholyte is alkaline and contains at least 10% or more by weight of sodium hydroxide or like alkali metal hydroxide or carbonate or bicarbonate thereof. This is particularly true where the catholyte chamber in contact with the cathode is flooded. Often, such chamber is under some small superatmospheric pressure, particularly where alkali formed is withdrawn from the catholyte chamber above the top of the cathode.

These cells and the process herein disclosed may also be used for the generation of oxygen by electrolyzing water as well as for conducting other electrolytic reactions using a liquid electrolyte.

According to a further embodiment, the electrodes bonded to or coated on the membrane layer may be dispensed with and the screen current distributors used as the electrodes. Furthermore, one of the layers e.g. the cathode layer may have the cathode bonded thereto while the layer adjacent in the anode compartment may be uncoated with the anode being a valve metal screen or expanded metal sheet coated with a platinum group metal oxide pressed against the anode side of the multilayer diaphragm.

Although the present invention has been described with reference to specific details of certain embodiments thereof, it is not intended that such details should be regarded as limitations to the scope of the invention except insofaras included in the accompanying claims.

What I claim is:

1. A method of generating halogen and hydrogen which comprises electrolyzing an aqueous halide in an electrolytic cell having an anode and a cathode separated by a diaphragm comprising a first layer of a fluorocarbon polymer on the anode side of said diaphragm and having cation exchange groups linked to a fluorocarbon polymer chain and a second layer or section between the cathode and the first layer, said second layer having cation exchange groups linked to a second polymer chain, said second chain having a lower fluorine content than said first chain.

2. The method of claim 1 wherein said second polymer chain has a higher hydrogen to carbon ratio than the polymer chain of said first layer.

3. The method of claim 1 wherein the ratio of fluorine to carbon in said second layer is lower than in said first polymer and the halide is a chloride.

4. The method of claim 1 or 2 wherein the second polymer layer has a cation exchange surface which is more hydrophilic than the anode surface of said first layer.

5. The method of claim 1 wherein the halide is an alkali metal halide.

6. The method of claim 1, 2, 3 or 4 wherein the second layer is unfluorinated.

7. The method of claim 1 wherein the cathode is maintained in contact with the second layer or close enough thereto to maintain the second layer alkaline throughout its thickness.

8. The method of claim 7 wherein the anode is in contact with the anode surface of the diaphragm.

9. An electrolytic cell which comprises an anode and a cathode separated by a diaphragm which comprises a first layer of a fluorocarbon polymer on the anode side of said diaphragm and having cation exchange groups linked to a fluorocarbon polymer chain and a second layer or section between the cathode and the first layer, said second layer having cation exchange groups linked to a second polymer chain, said second chain having a lower fluorine to carbon ratio than said first chain.

10. The cell of claim 9 wherein said second layer has pores in which aqueous alkali is absorbed.

11. The cell of claim 9 wherein the hydroxide is sodium hydroxide solution containing at least 10% by weight of sodium hydroxide.

12. The cell of claim 9 or 11 wherein the second surface is more hydrophilic than the first surface.

13. The cell of claim 9 wherein the pores and the absorbed alkali metal hydroxide are disposed throughout the thickness of the portion of the diaphragm of higher hydrogen to carbon ratio.

14. A diaphragm for electrolysis of aqueous halide which comprises a first layer of a fluorocarbon polymer having cation exchange groups linked to a first fluorocarbon polymer chain and a second layer comprising a second cation exchange polymer, said second polymer having cation exchange groups linked to a second polymer chain, said second chain having a lower fluorine content than said first chain.

15. The diaphragm of claim 14 wherein the second layer has pores in which alkali is absorbed.

16. The diaphragm of claim 15 wherein the second polymer chain has a higher hydrogen to carbon ratio than said first polymer chain.

* * * * *